(12) United States Patent
Kim et al.

(10) Patent No.: US 8,346,389 B2
(45) Date of Patent: Jan. 1, 2013

(54) CLEANING ROBOT HAVING CARPET DETECTOR AND METHOD OF DETECTING CARPET BOUNDARY USING THE SAME

(75) Inventors: Yeon-ho Kim, Yongin-si (KR); Seok-won Bang, Seoul (KR); Joon-kee Cho, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1148 days.

(21) Appl. No.: 11/634,146

(22) Filed: Dec. 6, 2006

(65) Prior Publication Data

US 2007/0271004 A1    Nov. 22, 2007

(30) Foreign Application Priority Data

May 19, 2006   (KR) .................. 10-2006-0045281

(51) Int. Cl.
*G06F 19/00* (2011.01)
(52) U.S. Cl. .............. 700/245; 318/568.12; 318/568.16
(58) Field of Classification Search .................. 700/245; 15/319, 339, 340.1; 318/568.12, 568.16
See application file for complete search history.

(56) References Cited

U.S. PATENT DOCUMENTS

| | | | | |
|---|---|---|---|---|
| 2,159,164 A * | 5/1939 | Karlstrom | ................... | 15/375 |
| 2,312,905 A * | 3/1943 | Holm-Hansen | ................ | 15/319 |
| 3,599,271 A * | 8/1971 | Ljung et al. | ................... | 15/259 |
| 3,768,114 A * | 10/1973 | Schwartz | ...................... | 15/319 |
| 4,910,859 A * | 3/1990 | Holcomb | .................... | 29/564.2 |
| 4,953,253 A * | 9/1990 | Fukuda et al. | ................. | 15/319 |
| 4,977,639 A * | 12/1990 | Takahashi et al. | .............. | 15/319 |
| 5,044,043 A * | 9/1991 | Basham et al. | ................. | 15/319 |
| 5,722,109 A * | 3/1998 | Delmas et al. | .................. | 15/319 |
| 7,921,509 B2 * | 4/2011 | Oh et al. | ......................... | 15/358 |
| 2002/0116089 A1* | 8/2002 | Kirkpatrick, Jr. | ............. | 700/245 |
| 2004/0236468 A1* | 11/2004 | Taylor et al. | .................. | 700/245 |
| 2005/0132522 A1* | 6/2005 | Im et al. | ......................... | 15/319 |

(Continued)

FOREIGN PATENT DOCUMENTS

JP            2-241421         9/1990

(Continued)

OTHER PUBLICATIONS

Japanese Office Action for corresponding Japanese Application No. 2007-18827; dated Jan. 19, 2010.

(Continued)

*Primary Examiner* — Dalena Tran
*Assistant Examiner* — Jamie Figueroa
(74) *Attorney, Agent, or Firm* — Staas & Halsey LLP

(57) ABSTRACT

A cleaning robot having a carpet detector and a method of detecting a carpet boundary using the same, in which the presence of the carpet on a floor is detected. The cleaning robot having a carpet detector includes a main body, a driver fixed to the main body to move the robot, and the carpet detector detecting a carpet when the robot is driven by the driver. The method of detecting a carpet boundary includes detecting a carpet using respective carpet detectors fixed to both wheels of a robot, obtaining a moving distance of the robot for an interval between times at which the respective carpet detectors detect the carpet, and calculating a boundary direction of the carpet with respect to a moving direction of the robot using the moving distance and the interval between the times at which the respective carpet detectors detect the carpet.

14 Claims, 11 Drawing Sheets

U.S. PATENT DOCUMENTS

| | | | |
|---|---|---|---|
| 2005/0166355 A1* | 8/2005 | Tani | 15/319 |
| 2005/0171638 A1* | 8/2005 | Uehigashi et al. | 700/245 |
| 2005/0171644 A1* | 8/2005 | Tani | 700/253 |
| 2005/0273967 A1* | 12/2005 | Taylor et al. | 15/319 |
| 2006/0021168 A1* | 2/2006 | Nishikawa | 15/49.1 |
| 2006/0085095 A1* | 4/2006 | Reindle et al. | 700/258 |
| 2006/0190135 A1* | 8/2006 | Lee et al. | 700/245 |

FOREIGN PATENT DOCUMENTS

| | | |
|---|---|---|
| JP | 4-197327 | 7/1992 |
| JP | 5-46246 | 2/1993 |
| JP | 6-327598 | 11/1994 |
| JP | 8-38409 | 2/1996 |
| JP | 2003-225184 | 8/2003 |
| JP | 2005-313800 | 11/2005 |
| KR | 92-5947 | 4/1992 |
| KR | 1992-0007588 | 9/1992 |
| KR | 10-2004-0023420 | 3/2004 |

OTHER PUBLICATIONS

Japanese Office Action issued on Apr. 28, 2009 in corresponding Japanese Patent Application 2007-018827.

Japanese Office Action dated Feb. 8, 2011, issued in corresponding Japanese Patent Application No. 2007-18827.

* cited by examiner

CLEANING ROBOT HAVING CARPET DETECTOR AND METHOD OF DETECTING CARPET BOUNDARY USING THE SAME

CROSS-REFERENCE TO RELATED APPLICATION

This application is based on and claims priority from Korean Patent Application No. 10-2006-0045281, filed on May 19, 2006, in the Korean Intellectual Property Office, the disclosure of which is incorporated herein by reference.

BACKGROUND OF THE INVENTION

1. Field of the Invention

The present invention relates to a cleaning robot having a carpet detector and a method of detecting a carpet boundary using the same and, more particularly, to a cleaning robot having a carpet detector and a method of detecting a carpet boundary using the same, in which the boundary of a carpet is detected to determine the area of the carpet.

2. Description of Related Art

Generally, robots have been developed for use in various industries as a part of factory automation. With the advancements made in automatic control and remote control techniques, robots have been widely used to perform tasks or repeated routine tasks in place of workers under extreme conditions such as at high and low temperatures, or in dangerous environments such as outer space and the bottom of the sea.

Recently, robots have been used for housework in homes or for custodial tasks offices, as well as industrial applications. A cleaning robot is an example of such robots.

Cleaning robots or automated cleaning robots have been developed, which automatically perform cleaning with minimal assistance or control from a user. In this respect, cleaning robots are required to uniformly clean a cleaning area and select a suitable cleaning mode in accordance with the material or the state of the floor of the area to be cleaned.

However, cleaning robots often have a problem with identifying their position and preparing a map of an area to be cleaned to effectively perform cleaning tasks. Also, cleaning robots have a problem with durability as they may be easily damaged due to frequent collisions with obstacles or falling over steps.

Particularly, if a cleaning mode is set when the material to be cleaned or the state of the floor is not recognized, cleaning quality may be varied depending on the state of the floor. For example, when a cleaning robot is in a mode suitable for the cleaning of a wooden floor and the floor of a given room is a wooden floor with carpet in the middle of the room, the cleaning robot can perform cleaning along the wooden floor by means of a proper sucking force. However, a driving wheel of the robot may sink into the carpet when the robot travels on the carpet.

If the driving wheel sinks into the carpet, the distance between the floor and a suction part of the robot becomes short, whereby a greater sucking force can be given to the carpet than the floor. Also, if the driving wheel sinks into the carpet, a seam of the carpet is sucked into the suction part of the cleaning robot. This may disturb suction of the robot. In other words, since the state and the material of the floor become main factors in suction of the cleaning robot, the cleaning robot is required to recognize the state or the material of the floor.

Studies of allowing a cleaning robot or a hand-operated cleaner to recognize a material of a floor have been discussed.

Japanese Patent Publication No. 4-197327 discloses a method of identifying the presence of a carpet on a floor by sensing height variation of the floor using an infrared sensor. Korean Patent Publication No. 1992-0007588 discloses a cleaning robot having a supersonic transmitter and a supersonic receiver installed on a lower side to measure a distance using the transmission and reception times of supersonic waves for a predetermined period and recognize a step between a floor and a carpet using the measured distance. Korean Patent Laid-open Publication No. 2004-023420 discloses a cleaning robot provided with a plurality of infrared sensors to recognize a step part and perform cleaning by tracking a boundary of the step part.

As described above, to sense the carpet on the floor or recognize the step part, a plurality of infrared sensors or a supersonic sensor is provided. In this case, a problem occurs in that the manufacturing cost of the cleaning robot increases. Also, if the infrared sensor is exposed to strong light, the operational error may be generated. If the distance becomes short, the ultrasonic sensor may not operate normally.

Therefore, it is necessary to provide a cleaning robot that performs cleaning depending on types of the floor by simply sensing the presence of the carpet or the state of the floor without an expensive sensor.

BRIEF SUMMARY

An aspect of the present invention provides a cleaning robot having a carpet detector and a method of detecting a carpet boundary using the same, in which the presence of the carpet on a floor is detected by the carpet detector and the boundary of the carpet is also detected by the carpet detector while the robot is moving, thereby effectively cleaning the area of the carpet.

According to an aspect of the present invention, there is provided a cleaning robot having a carpet detector, which includes a main body, a driver fixed to the main body to move the robot, and the carpet detector detecting a carpet when the robot is driven by the driver, in which the carpet detector includes a contact part that is in contact with the carpet when the robot is moving on the carpet, and a sensing part sensing the motion of the contact part that is generated by the contact with the carpet.

In another aspect of the present invention, there is provided a cleaning robot having a carpet detector, which includes a main body, a driver fixed to the main body to move the robot, and the carpet detector detecting a carpet when the robot is driven by the driver, in which the carpet detector includes a contact part that is in contact with the carpet when the robot is moving on the carpet, and a pressure sensor or a touch pad sensing the pressure of the contact part that is generated by the contact with the carpet.

According to another aspect of the present invention, there is provided a method of detecting a carpet boundary, which includes detecting a carpet using carpet detectors each respectively fixed to a main body proximate to a wheel of a robot, obtaining a moving distance of the robot for a time interval between times at which the respective carpet detectors detect the carpet, and calculating a boundary direction of the carpet with respect to a moving direction of the robot using the moving distance and the time interval between the times at which the respective carpet detectors detect the carpet.

According to another aspect of the present invention, there is provided a carpet detector for a movable robot, including: a contact part contacting carpet when the robot moves into or on the carpet; and a sensing part sensing a motion of the contact part resulting from the contact. The contact part includes a roller which rotates when contacting carpet and the sensing part includes a rotation sensor sensing rotation of the roller, or the contact part includes a plate fixed to a support a portion of which extends within a fixing part, the plate being lifted by contact with carpet, and the sensing part senses movement of the contact part by sensing motion of an end of the support caused by a lifting of the plate, or the contact part includes a plate fixed to a support a portion of which extends within a fixing part, the plate being lifted by contact with carpet, and the sensing part is a touch pad or a pressure sensitive pad at a carpet-contacting surface of the plate.

According to another aspect of the present invention, there is provided a carpet detector for a robot, including: a fixed part connected to the robot; a contact part movably connected to the fixed part and contacting carpet when the robot moves onto carpet; and a sensing part sensing motion of the contact part resulting from contact of the contact part with the carpet. The contact part is connected to the fixed part by a flexible joint and the sensing part senses flexing of flexible joint, or the contact part is connected to the fixed part by a hinge and the sensing part senses hinged movement of the contact part about the hinge.

According to still another aspect of the present invention, there is provided a method of detecting a carpet boundary using robot having a carpet detector at each wheel, the method including advancing the robot along a floor so as to make a straight advance to detect a boundary of a carpet on a floor, tracking the boundary of the carpet by identifying motion states or pressure states of the carpet detectors, determining whether the tracked boundary is a closed loop, determining, when the tracked boundary is not a closed loop, whether wheels of the robot have strayed from the carpet and repeating the determining whether the tracking boundary is a closed loop, when the wheels have not strayed from the carpet, and rotating the robot toward a wheel on the carpet, when wheels of the robot have strayed from the carpet.

Additional and/or other aspects and advantages of the present invention will be set forth in part in the description which follows and, in part, will be obvious from the description, or may be learned by practice of the invention

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1A:
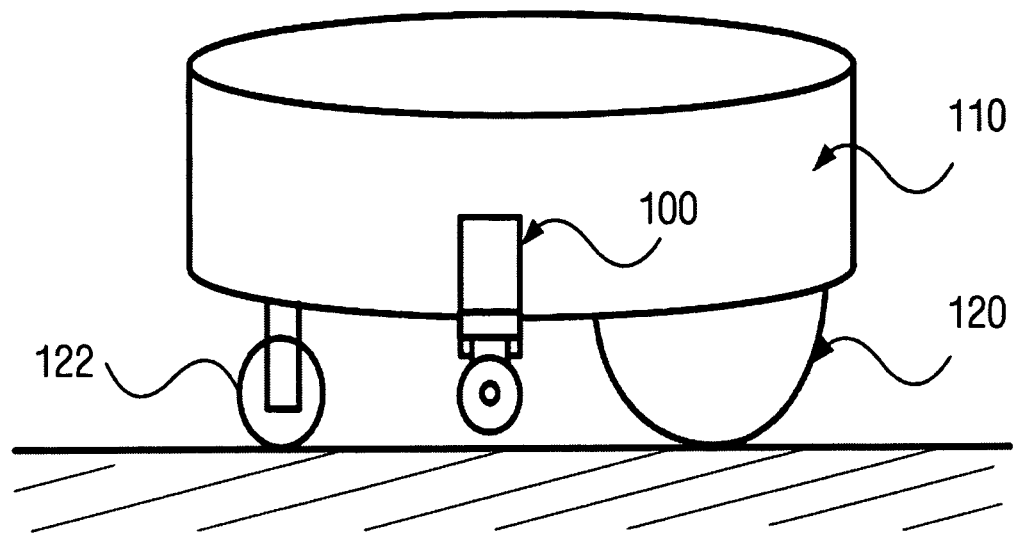
FIG. 1A is a schematic view illustrating a cleaning robot having a carpet detector on a floor according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1B:
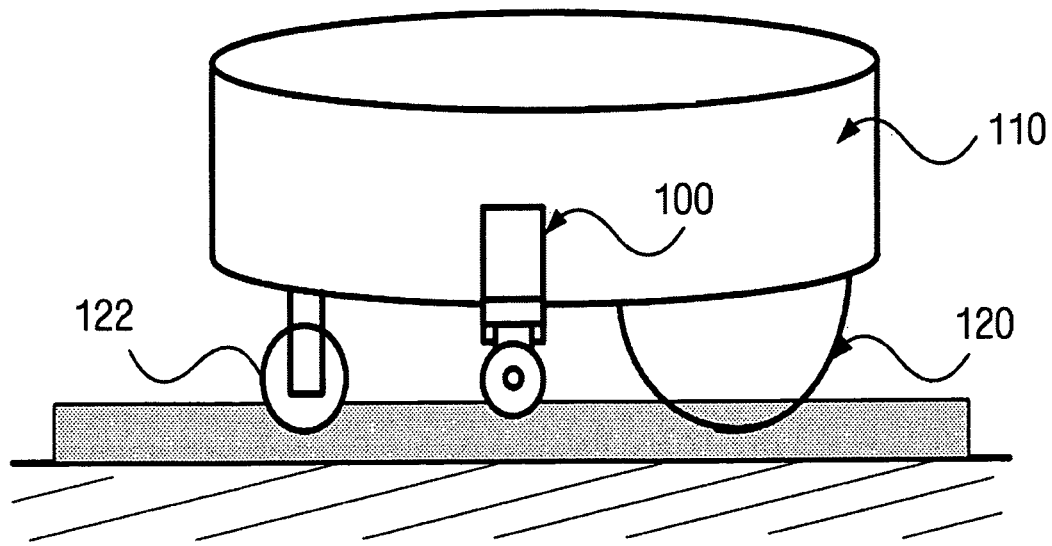
FIG. 1B is a schematic view illustrating a cleaning robot having a carpet detector on a carpet according to an embodiment of the present invention.
Figure 1C:
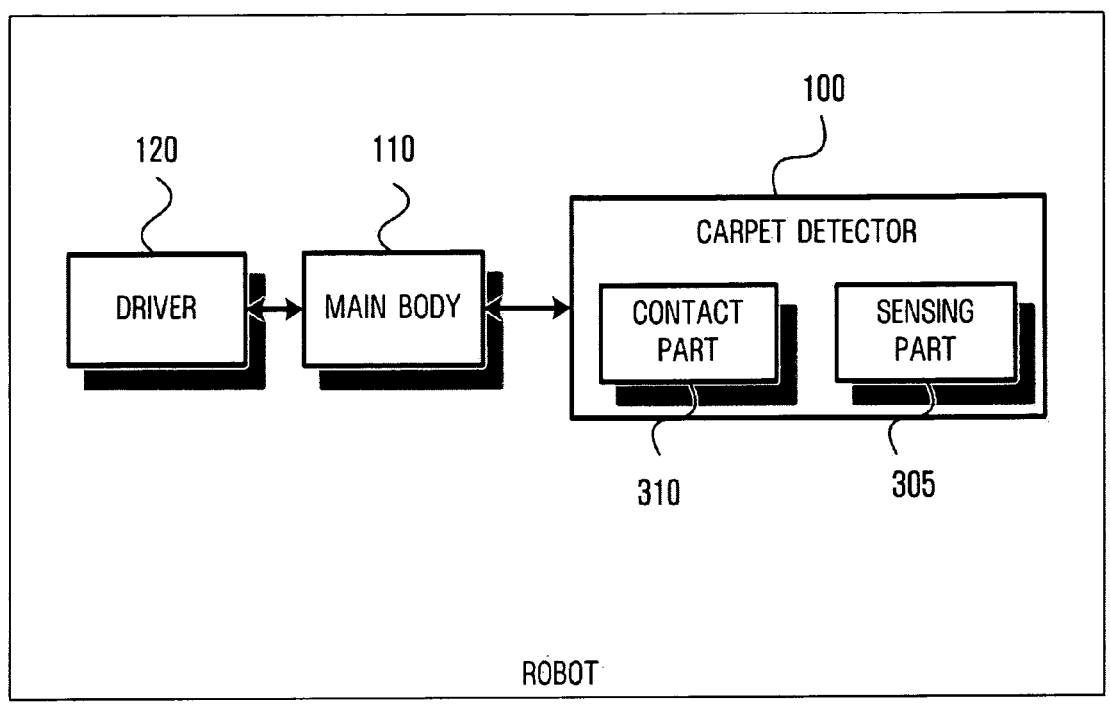
FIG. 1C is a block diagram illustrating the construction of a cleaning robot having a carpet detector according to an embodiment of the present invention.
Figure 2:
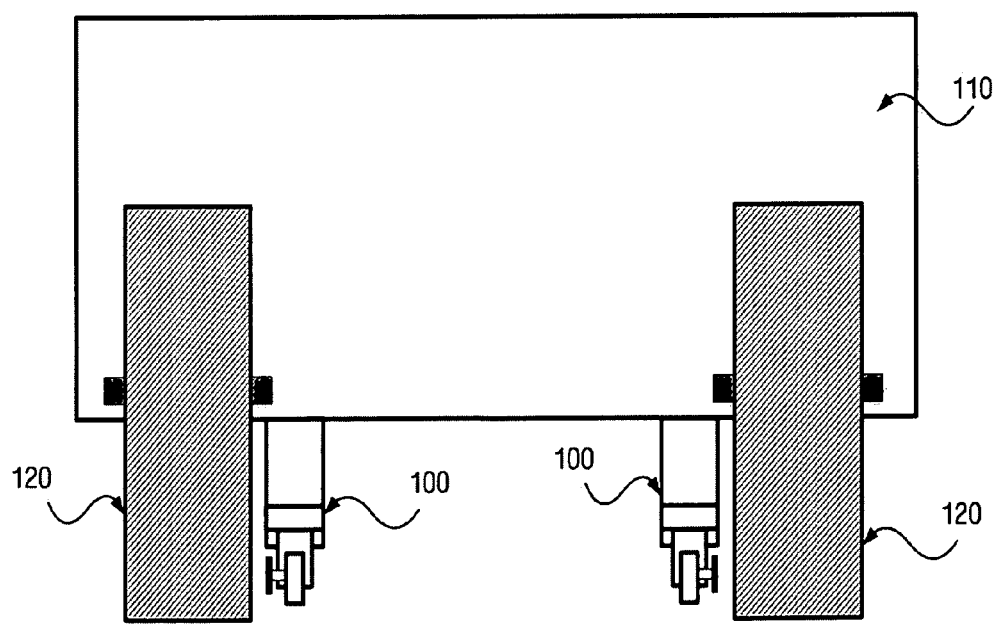
FIG. 2 is a front view illustrating a cleaning robot having a carpet detector according to an embodiment of the present invention.
Figure 3:
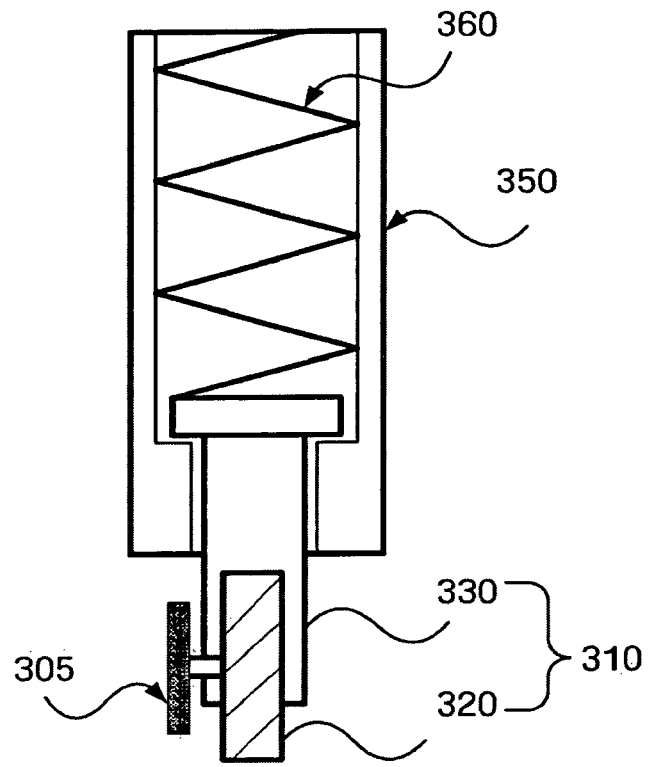
FIG. 3 is a sectional view illustrating a carpet detector provided with a roller in a cleaning robot according to an embodiment of the present invention.

FIG. 1A is a schematic view illustrating a cleaning robot having a carpet detector on a floor according to an embodiment of the present invention, FIG. 1B is a schematic view illustrating a cleaning robot having a carpet detector on a carpet according to an embodiment of the present invention, FIG. 1C is a block diagram illustrating the construction of a cleaning robot having a carpet detector according to an embodiment of the present invention, FIG. 2 is a front view illustrating a cleaning robot having a carpet detector according to an embodiment of the present invention, and FIG. 3 is a sectional view illustrating a carpet detector provided with a roller in a cleaning robot according to an embodiment of the present invention.

Referring to FIGS. 1A-3, a cleaning robot according to an embodiment of the present invention includes a main body 110, a driver 120 provided in the main body to move the robot, and a carpet detector 100 detecting a carpet when the robot is driven by the driver.

Generally, the main body 110 of the cleaning robot includes the driver 120 driving the cleaning robot and a space for a sensor sensing an obstacle. The main body 110 of the cleaning robot further includes a dust collector (not shown) collecting dust to remove it, and a dust collecting control circuit (not shown) controlling dust collecting action. Accordingly, the main body of the cleaning robot serves to load functional elements of the robot or move the position of the robot.

The driver 120 includes a driving motor (not shown) exerting a driving force, a caterpillar or wheel (not shown) having a predetermined diameter, driven by the driving motor, and a driving control circuit (not shown) controlling a driving operation. Both wheels driven by the driver and a hand-operated wheel 122 can be used for motion of the robot.

The carpet detector 100 includes a contact part 310 contacting the carpet when the main body is driven on the carpet by the driver, a fixing part 350 connected with the contact part, fixing the carpet detector to a lower surface or a lateral surface of the robot, and a sensing part 305 fixed to the contact part or the fixing part, sensing that the robot has been in contact with the carpet. The carpet detector 100 serves to detect the carpet while the cleaning robot is being moved. The carpet detector 100 may respectively be arranged to adjoin both wheels, as shown in FIG. 2, or to adjoin only one carpet detector may be arranged in the main body 110.

The contact part 310 serves to contact the carpet. The contact part 310 includes a rotatable roller 320 and a support 330 moving up and down in the fixing part, wherein the roller 320 is fixed to a lower part of the support 330. As shown in FIG. 3, since the contact part 310 includes the roller 320, the roller is rotated by contact with the carpet when the robot is moved. Accordingly, a part of the carpet where the roller 320 starts to rotate becomes a boundary of the carpet, and the roller 320 of the contact part 310 continues to rotate while the robot is moving on the carpet.

The support 330 can move up and down in the fixing part when the roller 310 is fixed to its lower part. The roller 320 in contact with the carpet generates a counteractive force through contact with the carpet to lift the contact part 310. In other words, although the wheels of the cleaning robot enter the carpet due to weight of the main body 110, the contact part 310 enters the fixing part 350 using counteraction upwardly acting toward the carpet so that the support 330 can move up and down. Accordingly, a lubricant or a guide member for sliding may be provided between the support 330 and the fixing part 350 to desirably move the support 330 up and down.

The sensing part 305 senses that the robot has moved onto the carpet via the contact part. As shown in FIG. 3, when the carpet is in contact with the roller 320 of the contact part, the roller 320 is rotated. Accordingly, the sensing part 305 senses that the floor where the robot is moving is the carpet by sensing rotation of the roller 320.

An example of the sensing part sensing rotation of the roller includes a rotation sensor 305. An encoder or a potentiometer may be used as the rotation sensor 305. The rotation sensor 305 senses rotation of the roller to obtain a rotation amount of the roller. Accordingly, the rotation sensor 305 can obtain the motion distance of the roller while the roller is rotated by obtaining the rotation amount of the roller.

The fixing part 350 allows the contact part 310 and the sensing part 305 to be fixed to the carpet detector 100. The carpet detector 100 can be fixed to the lower part or the lateral part of the main body of the robot through the fixing part 350. If the carpet detector 100 is fixed to the main body of the robot by the fixing part 350, the roller 320 of the contact part 310 has a predetermined height from the floor having no carpet. In other words, if the roller 320 is in contact with the floor having no carpet, its position is too low. If the roller 320 is not in contact with the floor having no carpet, its position is too high. Accordingly, the fixing part 350 can adjust the length of the carpet detector 100 to obtain a predetermined height from the floor, whereby the roller can be rotated on the carpet in contact with the carpet. As shown in FIG. 3, the rotation sensor 305 connected with the fixing part 350 by the support 330 of the contact part, sensing that the roller 320 of the contact part is rotated can be fixed to the side of the contact part 310. Also, the fixing part 350 is connected with the contact part to guide up and down motion of the support 330. The upper surface of the fixing part 350 is fixed to the lower surface or the lateral surface of the cleaning robot, so that the carpet detector 100 is fixed to the main body 110 of the robot.

As shown in FIG. 3, an elastic member 360 such as, by way of non-limiting examples, a spring or sponge is inserted into the guide member of the roller, and the roller 320 can be maintained at a proper height on the floor using the elastic element. Since the contact part 310 has a predetermined weight, and the support 330 of the contact part can be slid inside the fixing part 350, the contact part can be restored to its original state by gravity after the robot passes the carpet even though the height of the contact part increases. Accordingly, after the robot passes the carpet, the contact part 350 can be restored to its original state by gravity due to its weight even though the elastic member such as a spring or sponge is not provided in the fixing part 350.

Furthermore, the fixing part 350 is formed in a single body with the support 330 of the contact part. Since a small force is given to the contact part of the carpet detector even though the cleaning robot is moving on the carpet, the contact part does not disturb motion of the robot. Accordingly, since the carpet can be recognized by the contact part such as the roller 320 even though the contact part 310 is not lifted, the support 330 can be included in the fixing part 350 in a single body.

The operation of the aforementioned cleaning robot having a carpet detector according to the present embodiment will now be described.

To detect the carpet, as shown in FIG. 1B, the robot is in contact with the carpet in the part where the carpet is present. In other words, as shown in FIG. 1A, since the carpet detector 100 is arranged to be higher than the wheels of the robot on the floor on which the carpet is not present, no force is applied to the carpet detector 100. However, when the robot is moving on the part where the carpet is present, the wheels of the robot are buried in the carpet, whereby the contact part of the carpet detector 100 is brought into contact with the carpet.

If the roller is in contact with the carpet, the robot is moved to rotate the roller. Accordingly, the sensing part 305 can recognize that the robot is moving on the carpet by sensing rotation of the roller 320. If rotation of the roller is stopped, the sensing part can recognize that the carpet does not exist on the floor where the robot is moving. The rotation amount of the roller can be obtained using the encoder or the potentiometer corresponding to the rotation sensor 305, and the size and the area of the carpet can be assumed using the rotation amount of the roller.

Figure 4:
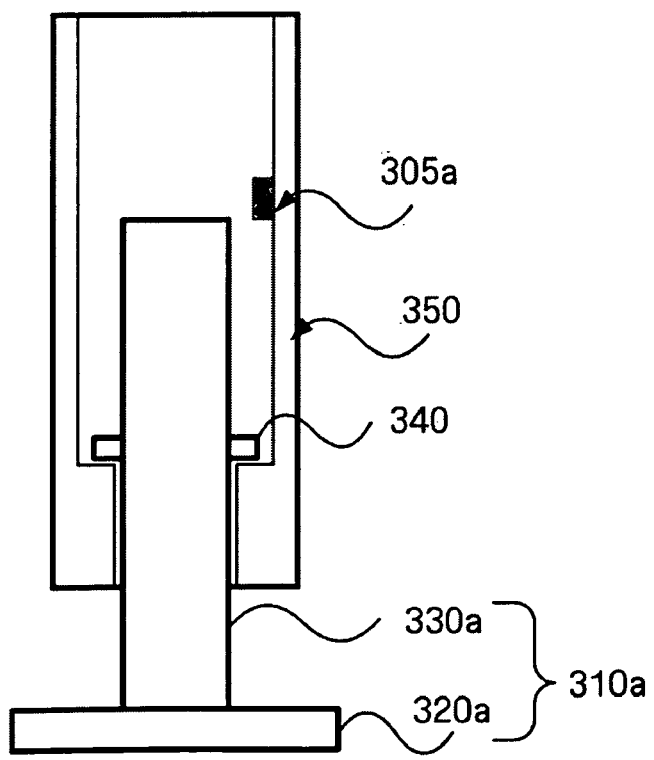
FIG. 4 is a sectional view illustrating a carpet detector provided with an optical sensor in a cleaning robot according to an embodiment of the present invention.
Figure 5A:
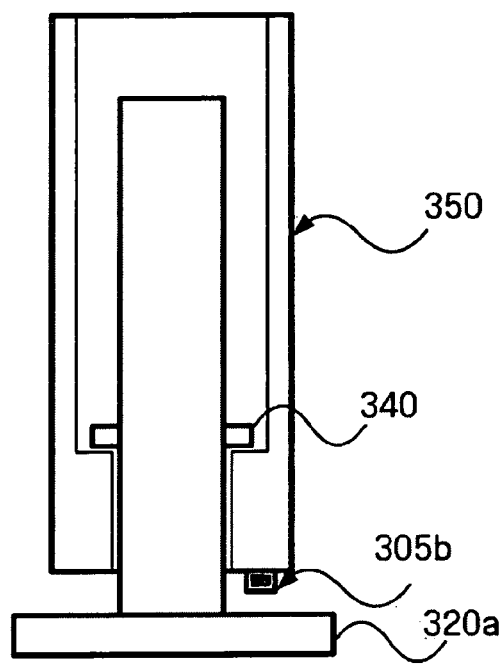
FIGS. 5A, 5B, and 5C are sectional views illustrating three carpet detectors provided with a limit sensor in a cleaning robot according to an embodiment of the present invention.
Figure 5B:
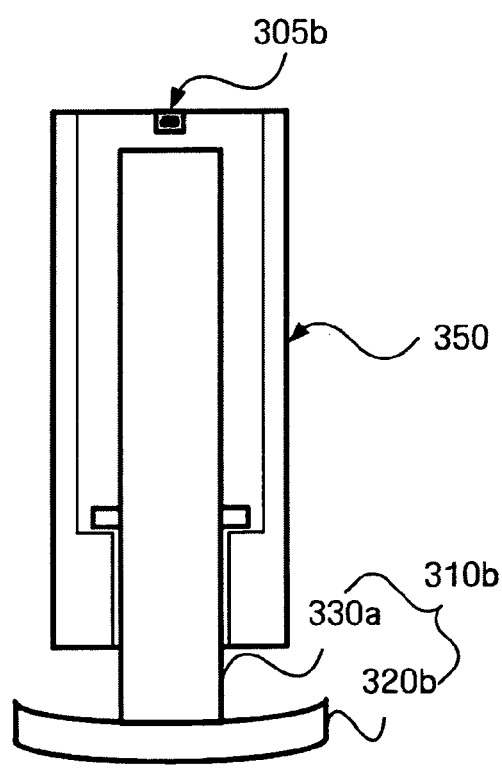
Figure 5C:
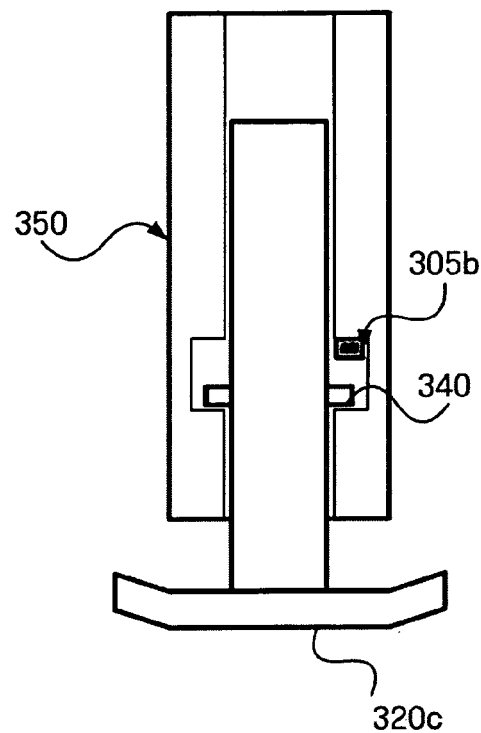
Figure 6:
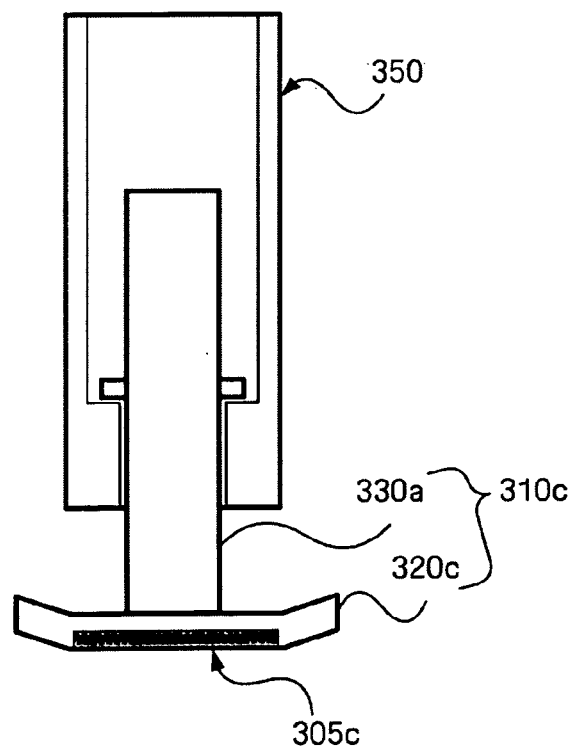
FIG. 6 is a sectional view illustrating a carpet detector provided with a pressure sensor in a cleaning robot according to an embodiment of the present invention.

FIG. 4 is a sectional view illustrating a carpet detector provided with an optical sensor in the cleaning robot according to an embodiment of the present invention, FIGS. 5A, 5B, and 5C are sectional views illustrating three carpet detectors provided with a limit sensor in the cleaning robot according to an embodiment of the present invention, and FIG. 6 is a sectional view illustrating a carpet detector provided with a pressure sensor in the cleaning robot according to an embodiment of the present invention.

Referring to FIG. 4, the carpet detector serves to detect the carpet by detecting up and down motion of the contact part, and includes a contact part 310a, a sensing part 305a, and a fixing part 350.

As shown in FIG. 4, the contact part 310a is provided in such a manner that a circular or polygonal plate 320a is fixed to a support 330a. If the plate 320a of the contact part is in contact with the carpet, the support 330a is slid inside the fixing part 350 by a force of the carpet to lift the contact part. The plate 320a may have a downward convex shape to be fixed to the support 330a or may have a partially angled part with a pointed lower part to reduce a contact area with the carpet. In this case, the lowest part of the plate 320*a* fixed to the support has a predetermined height from the floor.

The sensing part 305*a* serves to sense lifting of the contact part 310*a* if the contact part 310*a* is lifted in contact with the carpet. Accordingly, an optical sensor 305*a* may be provided in the fixing part, so that the sensing part can motion in the upper end of the support. In this case, the sensing part senses through the optical sensor 305*a* whether light is passed or shielded, whereby lifting of the contact part 310*a* can be sensed. For example, if the sensing part senses lifting of the contact part, it is possible to recognize that the robot is moving on the carpet. If the contact part is restored to its original state (i.e., if the contact part is come down after lifting), the sensing part can sense that the robot is moving on the floor.

Also, a limit sensor can be used as a sensor that senses lifting of the contact part as shown in FIGS. 5A, 5B, and 5C. The limit sensor has a manual switch mode and is operated by operating a switch using a mechanical force of the contact part. In other words, in case where the plate 320*a* of the contact part is in contact with the carpet to lift the contact part 310*b*, the contact part 310*b* is lifted along the inner part of the fixing part 350 so that it can be in contact with the limit sensor 305*b* fixed to the fixing part. For example, if the plate 320*a* of the contact part is in contact with the limit sensor 305*b* so that the switch being pressed, the limit sensor 305*b* is operated and thus can sense that the robot is moving on the carpet. The limit sensor is fixed to the lower part of the fixing part as shown in FIG. 5A so that it may be operated as the plate 320*a* of the contact part is lifted. Alternatively, as shown in FIG. 5B, the limit sensor may be fixed to the upper part of the fixing part so that it may also be operated as the support 330*a* of the contact part is lifted. Moreover, as shown in FIG. 5C, the limit sensor may be fixed to an upper part of a groove of the fixing part so that it may be operated as an overhang 340 of the contact part is lifted. It is to be understood that the aforementioned locations are merely non-limiting examples and that other locations are both possible and contemplated.

Instead of the limit sensor, a proximity sensor may be fixed to the upper part of the contact part as shown in FIGS. 5A to 5C. In this case, if the contact part is lifted through the guide member of the fixing part by contact with the carpet, the proximity sensor can sense the carpet by sensing lifting of the contact part. Also, instead of the limit sensor, a lead sensor may be used. The lead sensor senses motion of a metal or magnet as the contact part is lifted after the metal or magnet is fixed to the upper part of the support of the contact part. Similarly to the proximity sensor, in order to sense that the robot is moving on the carpet, the lead sensor senses motion of the metal or magnet on the upper part of the support of the contact part if the contact part is lifted through the fixing part by contact with the carpet.

Furthermore, a pressure sensor 305*c* such as a touch pad may be fixed to the contact part. Since does not contact the carpet detector 100 when the robot is moving on the floor, no pressure is sensed. However, if the robot is moving on the carpet, the carpet contacts the contact part 320*c* of the carpet detector and a predetermined force is applied to the contact part 305*c*. Accordingly, if the pressure sensor 305*c* is fixed to the contact part to sense a predetermined pressure, the pressure sensor can sense that the robot is moving on the carpet.

As shown in FIG. 6, if the touch pad or the pressure sensor 305*c* is fixed to the plate of the sensing part, the contact part 302*c* and the fixing part 350 are the same as those of FIG. 5. However, the sensing part is provided with the touch pad or the pressure sensor 305*c* to sense the carpet. Also, the contact part and the fixing part may be fixed to each other in a single body so that the sensing part can sense that the robot is in contact with the carpet during its motion.

Figure 7A:
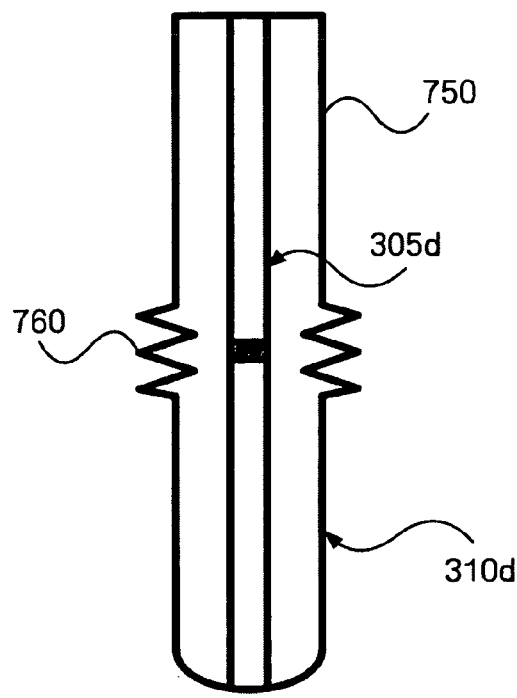
FIGS. 7A and 7B are sectional views illustrating a carpet detector provided with a bellows in a cleaning robot according to an embodiment of the present invention.
Figure 7B:
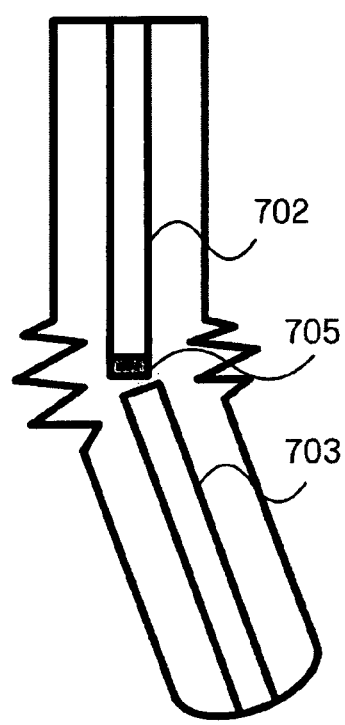

FIGS. 7A and 7B are sectional views illustrating a carpet detector provided with a bellows in the cleaning robot according to an embodiment of the present invention.

The carpet detector of FIGS. 7A and 7B includes a contact part 310*d*, an upper fixing part 750, a bellows 760, and a sensing part 305*d*. The upper fixing part 750 is fixed to the lower part of the cleaning robot and serves to fix the carpet detector 100 of FIG. 1 to the lower surface or the lateral surface of the cleaning robot. The bellows 760 serves to connect the upper fixing part 750 with the contact part 310*d*. The contact part 310*d* is connected with the bellows 760 to freely move through contact with the carpet. For example, if the contact part 310*d* is in contact with the carpet, one side of the bellows 760 is extended and the other side of the bellows 760 is compressed, whereby the carpet detector 100 has a generally curved shape, as shown in FIG. 7B, to detect the carpet.

Since the contact part 310*d* is connected with the upper fixing part 750 by the bellows 760, it can freely be moved within a predetermined range by contact with the carpet. In most cases, if the robot is in contact with the carpet during its motion as shown in FIG. 7B, a lower fixing part is curved by counteraction of the carpet in a direction opposite to a direction of movement of the robot.

The sensing part 305*d* includes an upper sensing part 702 and a lower sensing part 703 which are in contact with each other. A contact part between the upper sensing part 702 and the lower sensing part 703 includes a sensing means 705 that can sense detachment of the contact part. A limit sensor or switch can be used as the sensing means 705, and the sensing means 705 is turned off when the upper sensing part and the lower sensing part are in contact with each other but is turned on when they are spaced apart from each other. Accordingly, the sensing means can sense that the robot is moving on the carpet by sensing that the upper sensing part 702 is spaced apart from the lower sensing part 703.

Figure 8A:
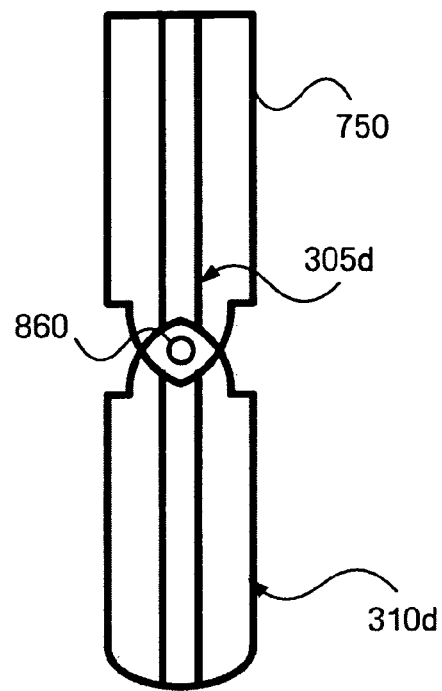
FIGS. 8A and 8B are sectional views illustrating a carpet detector provided with a joint in a cleaning robot according to an embodiment of the present invention.
Figure 8B:
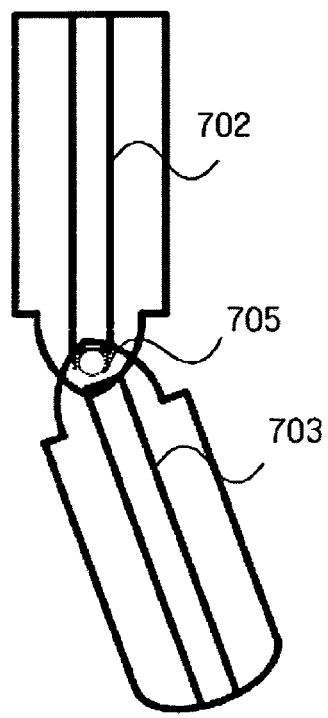

FIGS. 8A and 8B are sectional views illustrating a carpet detector provided with a joint part (a hinge) in the cleaning robot according to an embodiment of the present invention.

As shown in FIGS. 8A and 8B, the carpet detector includes an upper fixing part 750, a contact part 310*d*, a joint part 860, and a sensing part 305*d*. Since the upper fixing part 750 and the contact part 310*d* are similar to those shown in FIGS. 7A and 7B, their detailed description will be omitted. In FIGS. 8A and 8B, the upper fixing part 750 and the contact part 310*d* are connected with each other by the joint part 860. In this case, a lower part of the upper fixing part 750 and an upper part of the contact part 310*d* may be connected with the joint part 860.

The carpet detector includes the joint part 860 to connect the upper fixing part 750 with the contact part 310*d*, wherein the upper fixing part and the contact part are formed of a cylindrical or polygonal pipe. The joint part 860 serves to allow the contact part 310*d* to freely move in forward and reverse directions about the hinge while connecting the upper fixing part with the contact part. Accordingly, the joint part 860 may include a fitting means 860, such as rivet, bolt, and nut, to rotate the contact part 310*d* within a predetermined range.

The sensing part 305*d* serves to sense the carpet by allowing the contact part 310*d* to be in contact with the carpet when the robot is moving on the carpet. As shown in FIG. 8B, since the contact part 310*d* is oriented toward a rear side of a forward direction of the robot if the robot is moving on the carpet, the upper sensing part 702 and the lower sensing part 703 of the sensing part 305d are spaced apart from each other, whereby the sensing part 305d can sense that the robot is moving on the carpet.

The cleaning robot can detect the carpet during motion through the aforementioned various carpet detectors. If the cleaning robot detects the carpet, it can vary suction and when it cleans a floor having no carpet, it may operate a duster fixed thereto. In this way, the cleaning robot can effectively determine its cleaning method by identifying the presence of the carpet through the carpet detector.

Figure 9:
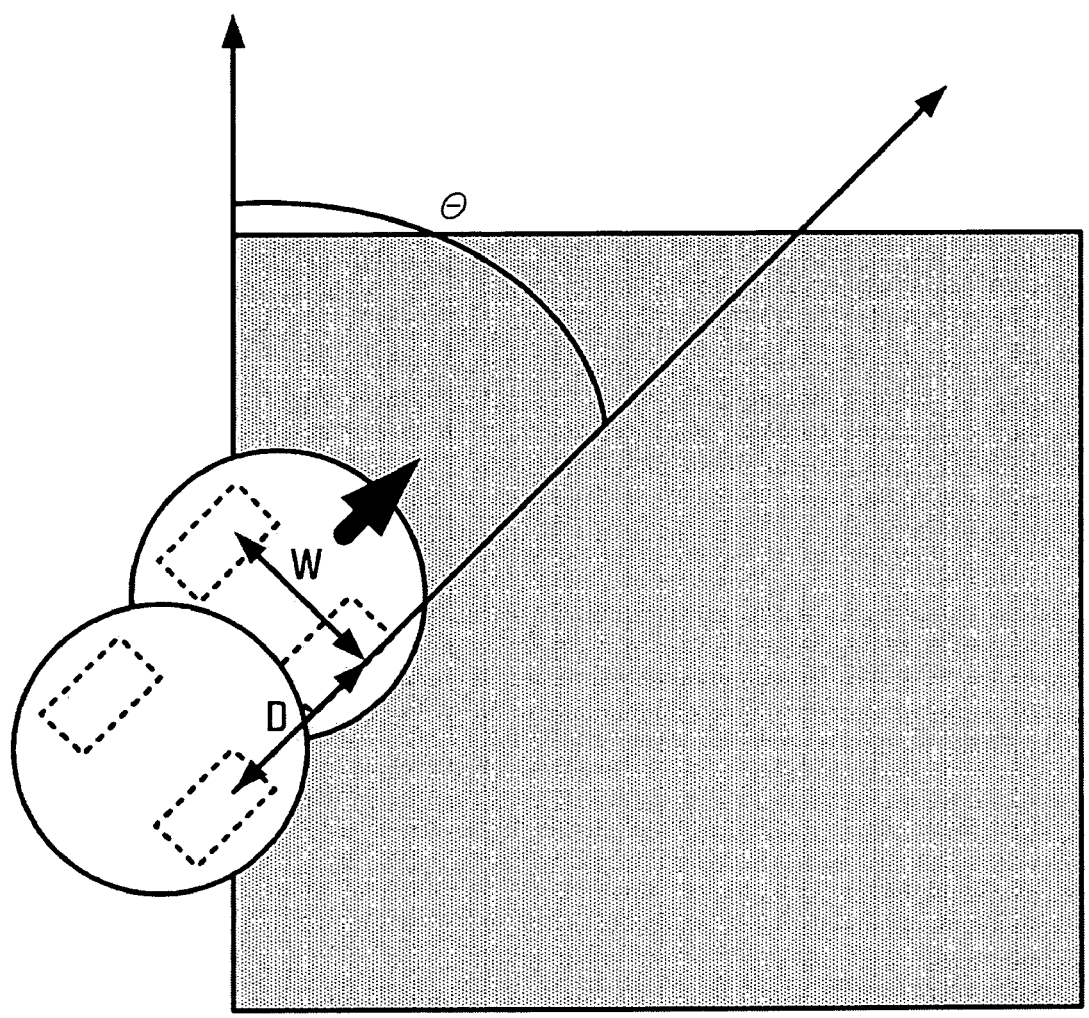
FIG. 9 is a view illustrating a boundary direction of a carpet corresponding to a moving direction of a robot.
Figure 10:
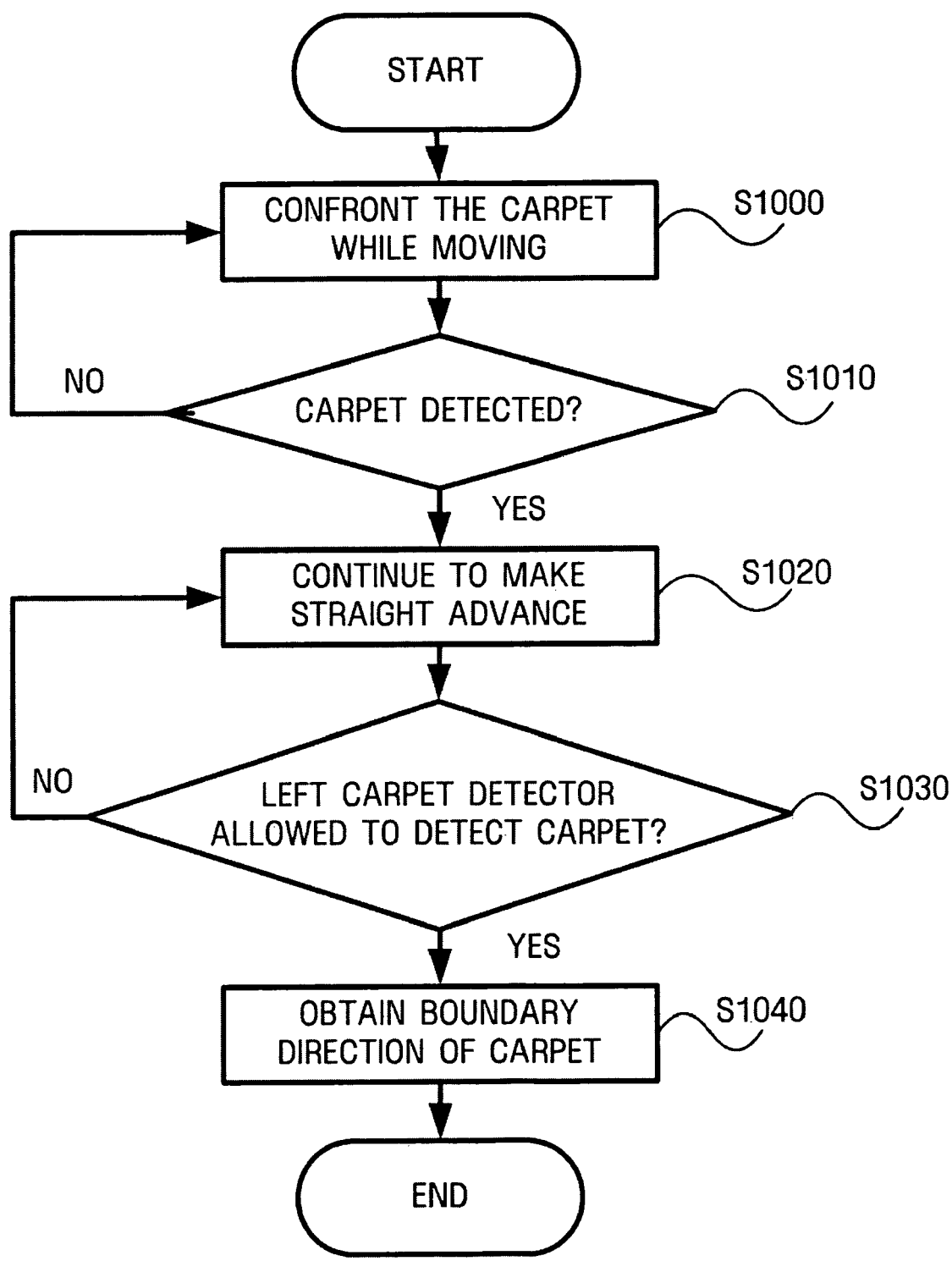
FIG. 10 is a flowchart illustrating a method of calculating a carpet boundary direction in a method of recognizing a carpet boundary of a cleaning robot having a carpet detector according to an embodiment of the present invention.

FIG. 9 is a view illustrating a boundary direction of the carpet corresponding to a moving direction of the robot, and FIG. 10 is a flowchart illustrating a method of calculating a carpet boundary direction in a method of recognizing a carpet boundary of the cleaning robot having the carpet detector according to an embodiment of the present invention.

In FIG. 3, the cleaning robot is moving, and the carpet detector 100 of FIG. 1 is respectively provided at both wheels corresponding to the driving wheel 120 of the cleaning robot. In this case, if the cleaning robot confronts the carpet while moving S1000, the right wheel is first moving on the carpet as shown in FIG. 9. Accordingly, the carpet detector 100 fixed to the right wheel can detect the carpet S1010. The cleaning robot continues to make a straight advance S1020, and its left wheel is moving on the carpet after moving at a distance D to allow the left carpet detector to detect the carpet (S1030). Supposing that the distance between the right carpet detector and the left carpet detector is referred to as W, a boundary direction θ of the carpet with respect to the moving direction of the robot can be obtained by the following equation S1040.

$$\theta = \arctan(W/D) \quad \text{[Equation 1]}$$

In the equation 1, W is a fixed value when the carpet detector is fixed to the robot. The moving distance D of the robot for a time interval caused by the detection difference between the respective carpet detectors can be obtained by various methods.

In other words, as a method of obtaining the moving distance D of the robot, the moving distance of the robot is calculated for a time interval in detecting the carpet through both carpet detectors. Both driving wheels may be provided with an encoder or a potentiometer to obtain the moving distance. In other words, the carpet detectors can detect the presence of the carpet using the aforementioned various examples. For example, in order to detect the presence of the carpet, the roller of the carpet detector may be rotated, the optical sensor may be operated due to lifting of the support of the contact part, the limit sensor may be operated due to lifting of the plate or the support of the contact part, or the pressure sensor or the touch pad fixed to the plate of the contact part may be operated to sense the pressure. Accordingly, since both driving wheels are driven on the carpet at different times to detect the presence of the carpet, the carpet detector 100 of FIG. 1 fixed to the wheels can detect the presence of the carpet at different times. However, the carpet detectors 100 are not always fixed to the wheels but may be located at points of both sides of the robot around the moving direction of the robot to detect the boundary direction of the carpet with respect to the moving direction of the robot using a certain equation. Accordingly, the carpet detectors 100 may be respectively fixed to both wheels but may be fixed to proper positions on a lower part of the robot to detect the boundary direction of the carpet.

Furthermore, the carpet detector 100 of FIG. 1 provided with the roller 320 shown in FIG. 3 detects rotation of the roller in contact with the carpet and calculates the rotation amount of the roller through the rotation sensor 305 to obtain the moving distance D of the robot. The carpet detector 100 provided with the roller 320 can obtain the moving distance for a time interval in detecting the carpet even without detecting the moving distance through the driver of the robot.

Figure 11:
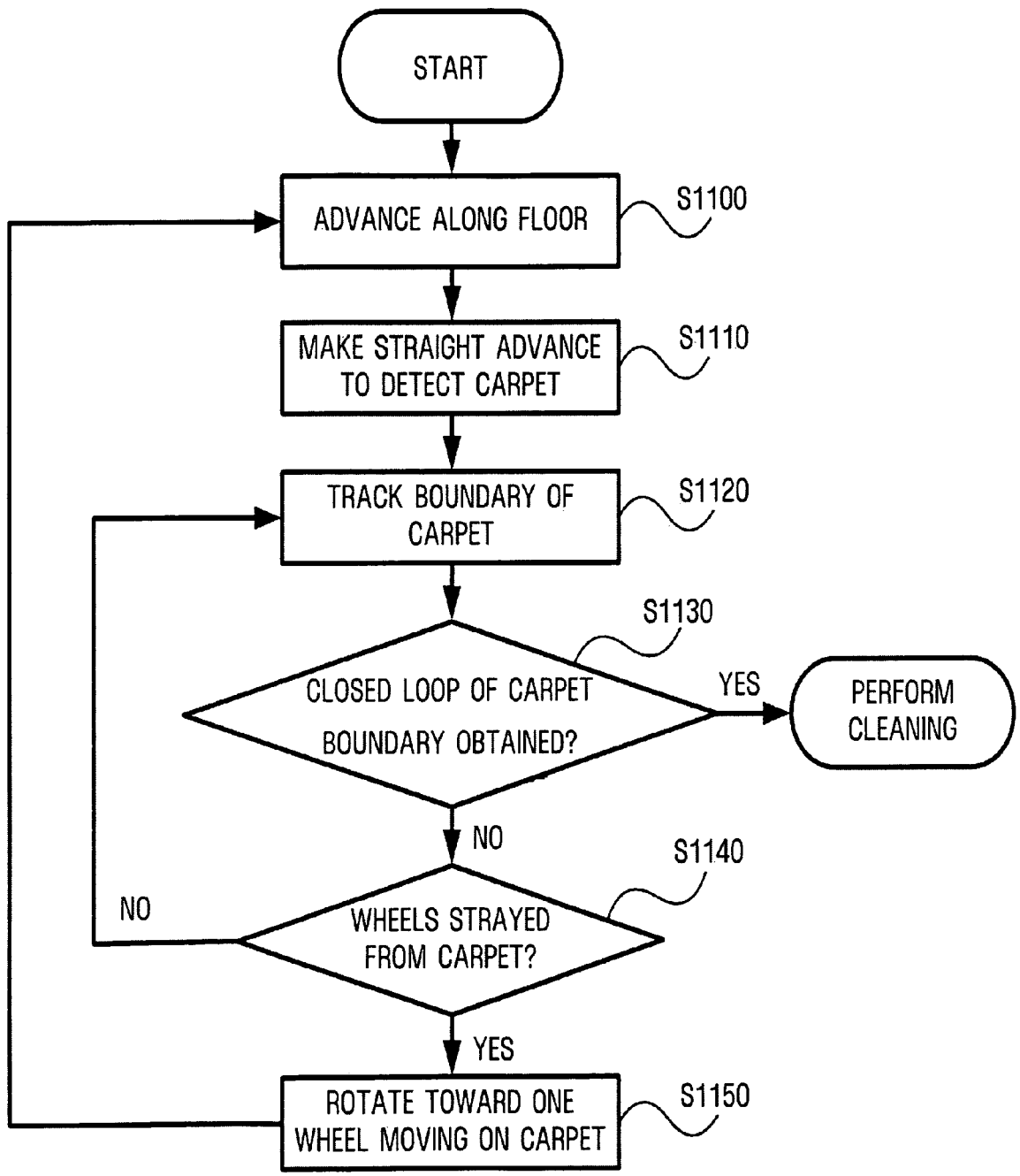
FIG. 11 is a flowchart illustrating a method of detecting a carpet boundary of a robot having a carpet detector according to an embodiment of the present invention.
Figure 12:
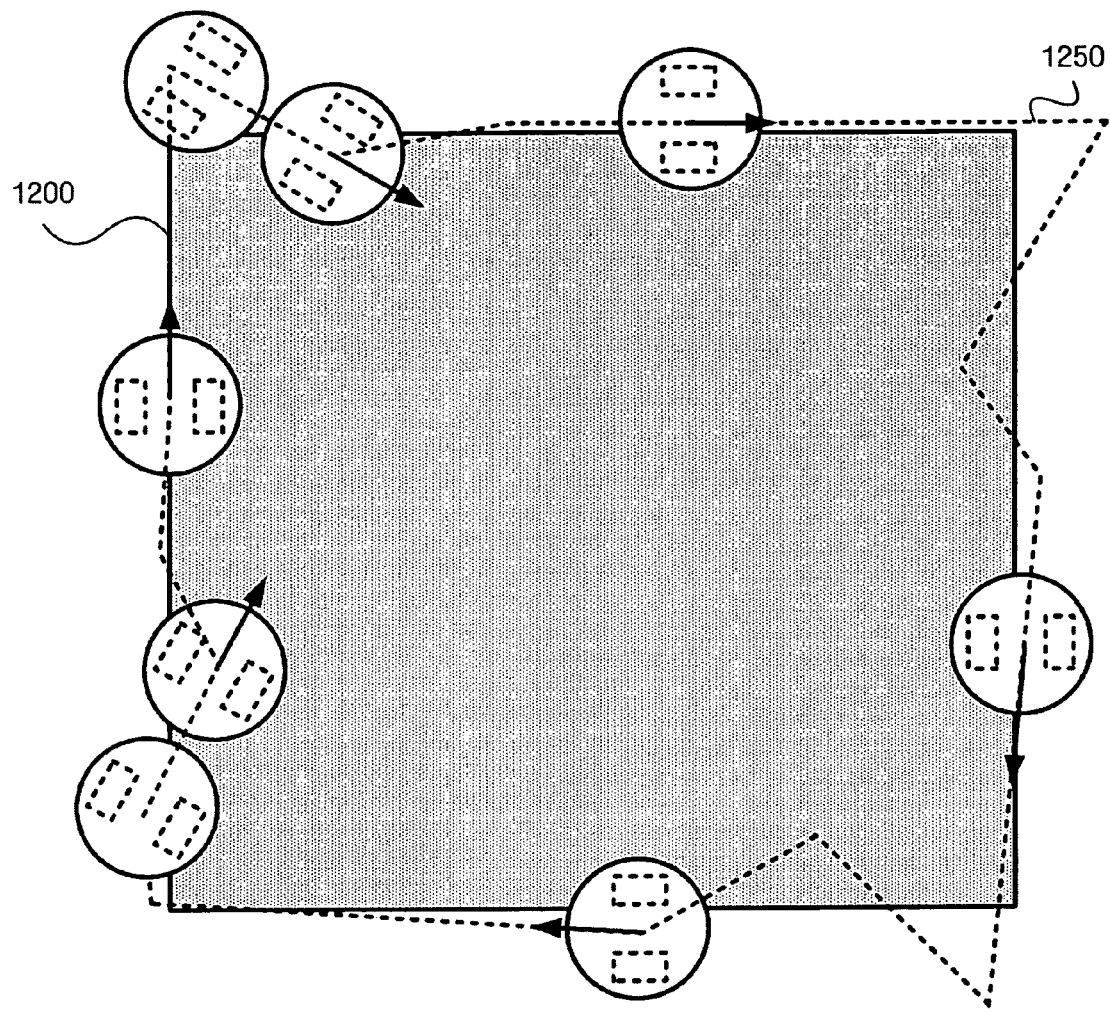
FIG. 12 is a view illustrating a detection path of a carpet boundary in a cleaning robot according to an embodiment of the present invention.

FIG. 11 is a flowchart illustrating a method of detecting a carpet boundary of the robot having the carpet detector according to an embodiment of the present invention, and FIG. 12 illustrates a detection path of the carpet boundary in the cleaning robot according to an embodiment of the present invention.

As shown in FIG. 11, the robot advances along the floor S1100. If the robot confronts the carpet during motion, the carpet detector at one of both wheels can detect the carpet. The robot continues to make a straight advance so that the carpet detector at the other side of both wheels can detect the carpet. Accordingly, if both carpet detectors at both wheels detect the carpet, the boundary direction of the carpet can be obtained by the equation 1 S1110. If the boundary direction of the carpet is obtained, the robot can be controlled to track in the boundary direction of the carpet S1120.

Since the carpet does not always have a square shape, the boundary of the carpet may have a circular or polygonal shape. However, since the carpet is relatively greater than the robot, the boundary direction of the carpet may locally be regarded as a straight line with respect to the moving direction of the robot. Accordingly, if the boundary direction of the carpet is recognized, one wheel of the robot is located on the floor and the other wheel of the robot is located on the carpet, whereby the robot can track the boundary of the carpet. Since a carpet detector is respectively provided at both wheels, it is possible to identify the type of the surface with which both wheels are in contact.

In order to track the boundary of the carpet, the robot identifies the motion state through the carpet detectors at both wheels while tracking the boundary direction. In other words, if the boundary direction of the carpet is obtained by the equation 1 after both wheels are arranged on the carpet, the robot tracks the boundary direction S1110. In other words, the robot can rotate from the current moving direction to the boundary direction and then can make a straight advance. Alternatively, the robot can rotate from the current moving direction to the boundary direction while making a straight advance. Furthermore, the robot can rotate a little more than the boundary direction to move from the carpet to the floor. Accordingly, one wheel is located on the floor and the other wheel is located on the carpet during motion in a straight line at a certain distance. In this state, the robot moves in a straight line by rotating in the boundary direction of the carpet, so as to track the carpet boundary.

Furthermore, if the robot reaches the corner of the boundary of the carpet and thus both wheels stray from the carpet during tracking the carpet boundary S1140, the robot rotates toward one wheel moving on the carpet directly after straying from the carpet S1150. In this case, if the carpet has a square shape, the robot is preferably rotated at an angle of 90° or greater. If the carpet has a polygonal or circular shape, the robot is preferably rotated at a predetermined angle. Accordingly, if the robot moves in a straight line after rotation, both wheels are again arranged on the carpet. The carpet detectors at both wheels can again obtain the boundary direction of the carpet by detecting the carpet. Accordingly, the robot again follows the method of tracking the carpet boundary.

If the aforementioned method is repeated, the robot can track the boundary even though the carpet has various shapes, and a closed loop recognized as the boundary of the carpet can be obtained by the aforementioned method S1130. If the closed loop is obtained, the moving path of the robot can be determined as the boundary of the carpet.

Therefore, the cleaning robot can perform cleaning by recognizing the inside of the carpet after identifying the boundary of the carpet. Since the robot can recognize the carpet area, the cleaning method different from the cleaning method of the floor can be used to clean the carpet area. If the same cleaning method is used, suction strength and cleaning speed can be varied.

As described above, the cleaning robot having a carpet detector and the method of detecting a carpet boundary using the same according to the present invention have the following advantages.

First, since the robot is provided with the carpet detector, it can conveniently detect the carpet.

Second, the robot can clean the carpet differently from the floor by detecting the carpet using the carpet detector.

Third, since the robot can detect the carpet boundary using the carpet detector, it can clean the inside of the carpet.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A cleaning robot having a single carpet detector to detect a state of a floor, comprising:
    a main body;
    a driver fixed to the main body to move the robot; and
    the single carpet detector detecting a carpet when the robot is driven by the driver, the carpet detector including a single contact part in contact with the carpet when the robot is moving on the carpet, and a single sensing part to sense motion of the contact part generated by the contact with the carpet,
    wherein the cleaning robot includes the single carpet detector to determine the state of the floor,
    wherein the sensing part includes a rotation sensor sensing rotation of the contact part.

2. The cleaning robot of claim 1, wherein the contact part includes a rotation part rotating in contact with the carpet when the robot is moving on the carpet.

3. The cleaning robot of claim 1, wherein the contact part includes:
    a plate lifted by contact with the carpet when the robot is moving on the carpet; and
    a support fixing the plate to a lower part of the main body and being moved inside a fixing part of the carpet detector when the plate is lifted.

4. The cleaning robot of claim 3, wherein the sensing part includes an optical sensor sensing lifting of the contact part.

5. The cleaning robot of claim 3, wherein the sensing part includes a limit sensor operated by lifting of the contact part.

6. The cleaning robot of claim 3, wherein the sensing part includes a proximity sensor operated by lifting of the contact part.

7. The cleaning robot of claim 3, wherein the sensing part includes a lead sensor operating by lifting of the contact part to sense a magnetic or metallic portion fixed to an upper part of the contact part.

8. The cleaning robot of claim 3, wherein the fixing part includes an elastic member that resists movement of the contact part by providing a resilient counter-force.

9. The cleaning robot of claim 1, wherein the carpet detector further includes a fixing part connected to the contact part to guide lifting of the contact part due to contact with the carpet when the robot is moving on the carpet and to fix the carpet detector to a lower or lateral surface of the main body.

10. The cleaning robot of claim 1, wherein the carpet detector further includes a bellows about which the contact part is movable, and the contact part is inclined around the bellows when the robot is in contact with the carpet when moving on the carpet.

11. The cleaning robot of claim 1, wherein the carpet detector further includes a joint part about which the contact part is movable, and the contact part is inclined around the joint part when the robot is in contact with the carpet when moving on the carpet.

12. The cleaning robot of claim 10, wherein the sensing part further includes a sensor sensing that an upper sensing part and a lower sensing part are fixed to and/or detached from each other by the motion of the contact part when the robot is moving on the carpet.

13. The cleaning robot of claim 11, wherein the sensing part further includes a sensor sensing that an upper sensing part and a lower sensing part are fixed to and/or detached from each other by the motion of the contact part when the robot is moving on the carpet.

14. The cleaning robot of claim 1, wherein the contact part and the sensing part are assembled vertically as one piece and the assembly is shorter than the driver so that the assembly does not contact a cleaning floor when the driver is moving on a hard floor but contact the carpet when the driver is moving on the carpet.

* * * * *